Aug. 20, 1968     C. I. RITCHIE ET AL     3,397,873
FLUID BED FURNACE AND THE LIKE

Filed Nov. 20, 1964     3 Sheets-Sheet 1

INVENTORS
CHARLES I. RITCHIE
JOHN A. KARPAC
BY
Oberlin, Maky & Donnelly
ATTORNEYS

INVENTORS
CHARLES I. RITCHIE
JOHN A. KARPAC

United States Patent Office 3,397,873
Patented Aug. 20, 1968

3,397,873
FLUID BED FURNACE AND THE LIKE
Charles I. Ritchie, Cleveland Heights, and John A. Karpac, North Royalton, Ohio, assignors, by mesne assignments, to Bangor Punta Operations, Inc., Bangor, Maine, a corporation of New York
Filed Nov. 20, 1964, Ser. No. 412,626
6 Claims. (Cl. 263—21)

The present invention relates as indicated to fluid bed furnaces, and more particularly to a fluid bed furnace of improved construction affording significant operational advantages when compared with presently available furnaces of this general type.

Fluidized bed apparatus in general is well known and finds use in many different, relatively diverse environments. In all of such environments, the general mode of operation is basically the same; a fluid under pressure is passed upwardly through a body or bed of finely divided solid material to be fluidized, with the rate of flow of such pressurized fluid being such as to produce substantially continuous motion of the individual solid particles. The resulting fluidized condition of the bed provides continuous intimate contact of the finely divided particles on objects immersed within the fluid bed. If a temperature difference exists between the temperatures of the fluid bed and the article or articles immersed therein, the resulting heat exchange or transfer is greatly expedited by the relatively high degree of the intimate contact thus provided. The use of such fluid bed as a heat transfer means has been particularly successful in the burning off or stripping of the insulation coating from electric motor components such as rotors, stators and the like. These insulative coatings, which may comprise, e.g., epoxy resin, are desirably removed for purposes of reclamation and rewinding and have proved difficult to remove by conventional hot air oven treatment.

A primary object of the present invention is to enhance incineration of fumes resulting from the nature of the treatment of the article or articles immersed in the fluidized bed by providing an exhaust system in which there is intimate mixing of such fumes and the products of combustion of the heat source for the fluidized bed whereby such fumes are substantially incinerated within the furnace.

A further object of the present invention is to provide such a fluid bed furnace wherein provision is made for return to the fluidized bed of any finely divided solid bed material which may be carried by the fluidizing medium into the exhaust duct system.

A further object of the present invention is to prevent the insulating material or the like stripped from the immersed articles from overlying the manifold openings at the bottom of the fluid bed by providing a basket adapted to be suspended in the sand bed and having a bottom, screened portion for catching the stripped material.

A further object of the invention is to provide a fluid bed furnace which is simple in construction and economical to manufacture.

These and other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
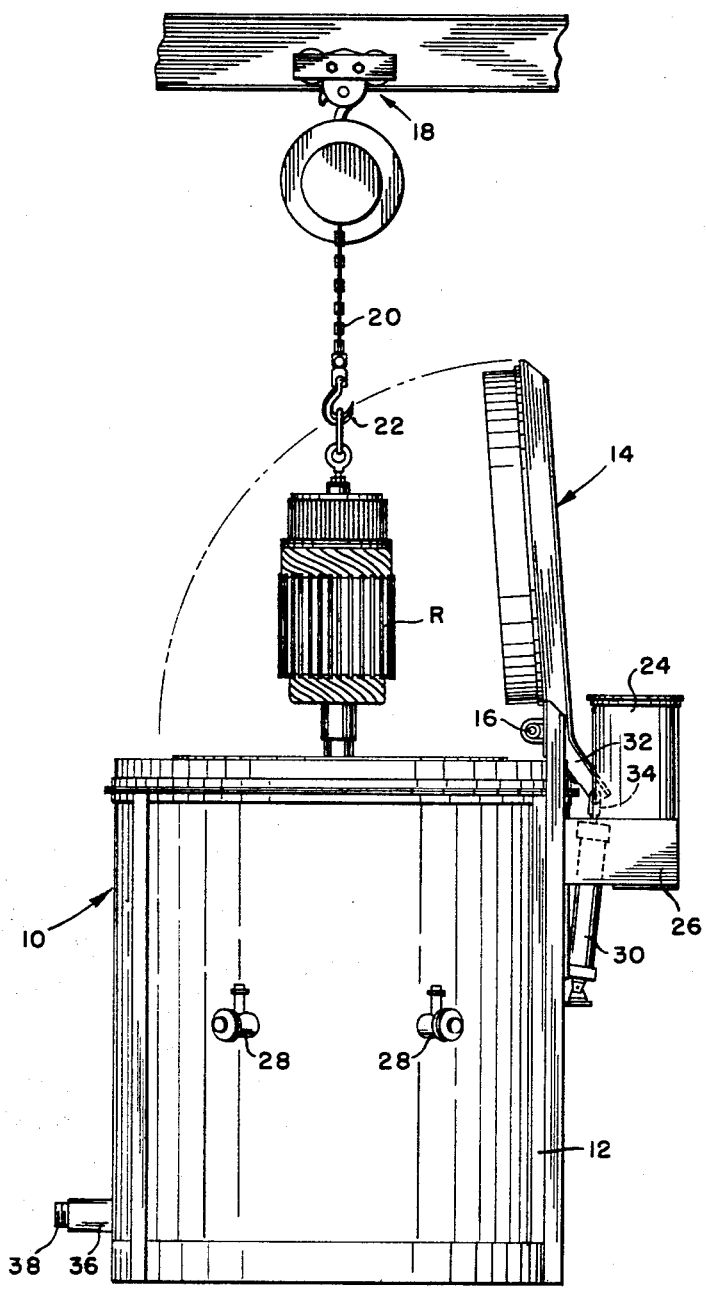
FIG. 1 is a side elevational view of the fluid bed furnace, with the cover thereof being shown open and the article to be treated therein being lowered into the furnace.

Referring now in more detail to the drawings, wherein like reference numerals are used to indicate like parts, the fluid bed furnace of the present invention is generally indicated at 10 and comprises an outer metal shell or casing 12 and a cover generally indicated at 14 which is hinged at 16 adjacent the top of the furnace for movement between a horizontal, closed position and a vertical, open position, the latter such position being shown in FIG. 1. With the cover in such open position, an article to be treated, e.g. a rotor R having an insulative coating of epoxy resin, can be lowered into the fluid bed 17, which in the form shown comprises sand, for treatment therein.

The rotor R can be lowered into and removed from the fluid bed by any suitable means, such as an overhead movable lift generally indicated at 18 which is provided with a chain 20 and hook 22 by means of which the rotor can be moved. It will be understood that the rotor illustrated merely exemplifies one type of article which can be stripped, i.e. surface cleaned through the burn-off of the insulative coating from the surface thereof, by the present fluid bed furnace, and that other articles of diverse size and shape could be similarly treated in the furnace of the present invention.

The furnace 10 further includes an exhaust stack 24 which is supported by an exhaust duct 26 which is mounted on the side wall of the furnace and communicates with the interior thereof. The products of combustion and the fumes resulting from the burn-off of the epoxy insulative coating pass outwardly of the furnace through the exhaust stack 24, in a manner to be more specifically described hereinbelow.

A plurality of circumferentially spaced gas burner assemblies commonly designated at 28 are mounted on the side wall of the furnace and extend therethrough to the furnace interior. The assemblies are preferably spaced equally apart circumferentially of the furnace and are counted thereon by means of burner plates 29, FIG. 2, bolted to the furnace side wall. The gas burners are of conventional construction, and it will be understood that, depending on the particular installation, electric heaters may alternatively be provided.

The door 14 is moved to and from its illustrated open position by means of a pneumatic cylinder 30 of commercially available type mounted at the exterior of the furnace with the door being provided with a bifurcated connecting arm 32, the outer end of which is pivotally connected to the outer end of the piston rod 34 of the cylinder 30.

A fluidizer generally indicated at 36 is mounted adjacent the bottom of the furnace for admitting the fluidizing medium, in this case air, into the fluid bed at the bottom thereof. The fluidizer forms no part of the present invention and may comprise, e.g., a plenum chamber underlying a porous refractory slab such as carborundum or fire-brick through which the fluidizing air can pass. The fluidizer includes a threaded nipple end 38 adapted to be connected to a source of pressurized air.

Figure 2:
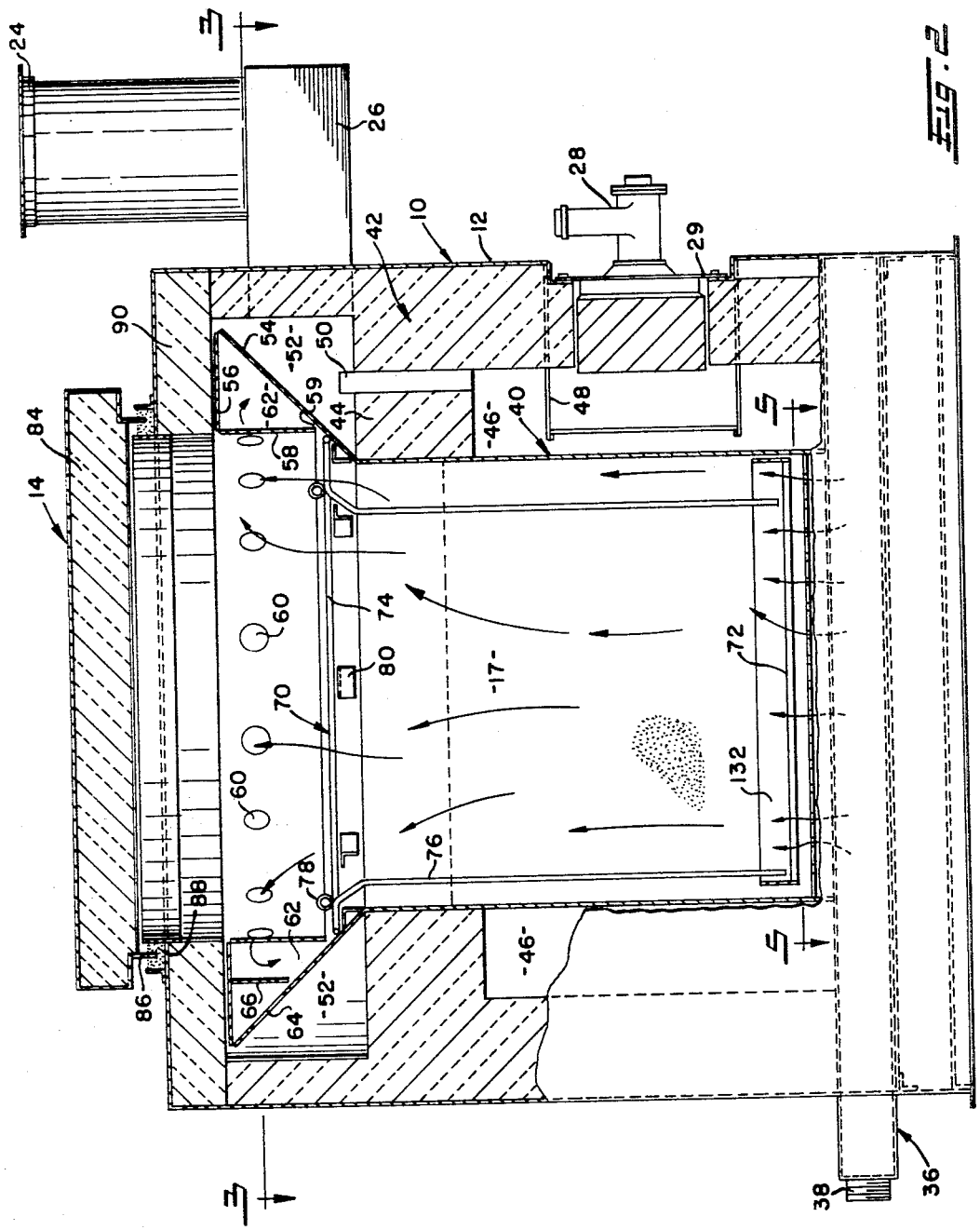
FIG. 2 is an enlarged, sectional view of the furnace taken on line 2—2 of FIG. 3, with the lower portion thereof being in elevation, the door being in a closed position, and the operating mechanism for actuating the same being omitted.
Figure 3:
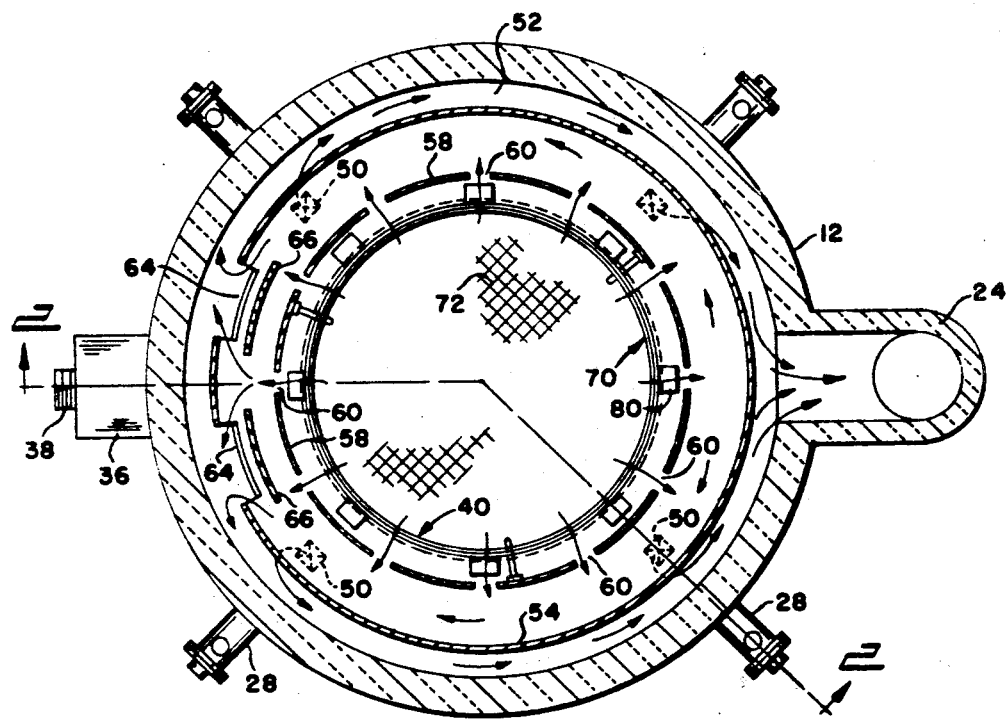
FIG. 3 is a relatively reduced sectional view taken on line 3—3 of FIG. 2, with certain structure being omitted for purposes of clarity.

Referring to FIGS. 2 and 3, which show in greater detail the internal construction of the furnace, the vessel or retort containing the fluidized sand bed is generally indicated at 40, with the bottom of the retort being supported in the furnace in any suitable manner, e.g. by the refractory slab fluidizer 36, which in turn is supported by the bottom frame assembly of the furnace. The retort bottom is of course provided with openings suitably shaped and located which communicate with the fluidizer openings for receiving the fluidizing air.

The retort 40 is spaced within the furnace by an annular layer of insulating firebrick generally indicated at 42 the relatively upper portion 44 of which extends between the furnace wall 12 and the wall of the retort 40. The annular space below the relatively thick portion 44 of the firebrick defines with the retort 40 an annular combustion chamber 46 the bottom of which is generally coextensive with the bottom of the retort. The burner assemblies 28, which of course communicate with the combustion chamber 46, are each preferably provided with baffles 48 the inner ends of which terminate relatively adjacent the retort 40.

The combustion products are exhausted from the combustion chamber 46 through a plurality of flues commonly designated at 50 which are preferably equally spaced around the retort and extend upwardly through the insulating firebrick. The upper ends of each of the flue members communicate with an annular, primary exhaust chamber 52 which in turn communicates with the exhaust stack 24.

The upper end of the retort 40 comprises an annular upwardly and outwardly inclined skirt 54 to which is secured a horizontally inwardly directed, annular top plate 56. A cylindrical sleeve 58 is secured to the top plate 56 and depends downwardly therefrom, with the lower end of the sleeve 58 terminating relatively adjacent the skirt 54 but providing a continuous opening 59 therebetween. The sleeve 58 is provided with a plurality of spaced openings commonly designated at 60 which permit the fluidizing air and the fumes produced during the stripping operation to be exhausted to an annular chamber 62 of generally triangular configuration defined by the sleeve 58, the plate 56 and the skirt 54. To provide for exhaust of the fluidizing air and fumes from the chamber 62, vent openings 64 are provided in the skirt 54 for establishing flow between the exhaust chambers 62 and 52, which are otherwise non-communicative. Referring to FIG. 3, the vent openings 64, which are two in number in the form shown, are generally opposite the stack 24, whereby the fluidizing air and fumes enter the primary exhaust chamber 52 for ultimate discharge from the furnace through the exhaust stack. The fumes passing outwardly therethrough traverse a substantial portion of the primary exhaust passage 52 thereby enhancing incineration of such fumes by the combustion gases. The resulting fume reduction is of particular importance in areas having rather stringent air pollution codes.

In the normal operation of the fluid bed, sand particles are commonly carried upwardly from the bed by the fluidizing air into the exhaust system. Such sand in present furnace constructions frequently passes entirely through the duct system outwardly of the furnace through the stack, and when not passing entirely through the duct system often collects in the various exhaust duct pasages thereby resulting in an obviously undesirable filling up of sand in such passages. By means of the present invention, any entrained sand entering the chamber 62 through the openings 60 will gravitate downwardly along the inclined skirt 54 and return to the fluid bed through the annular opening 59 provided by the spacing of the lower end of the sleeve 58 from the skirt 54. To prevent any entrained sand from passing through the vent openings 64 from the openings 60 generally opposite the same, a pair of baffles 66 are provided, with each of such baffles being slightly greater in dimension than the vent opening 64 associated therewith. As seen in FIG. 2, the baffles 66 are secured at their upper ends to the top plate 56 and extend downwardly and terminate relatively adjacent the skirt 54, whereby any sand carried by the fluidized air passing outwardly through the adjacent openings 60 will strike the baffles 66 and drop down to the skirt 54 for gravitational return to the fluid bed.

A basket generally indicated at 70 is adapted to be suspended within the fluid bed, with the basket including a wire mesh bottom screen portion 72 disposed above the bottom of the retort. The basket 70, and more particularly the meshed bottom screen 72 thereof, functions to catch any loose material stripped from the article during the stripping operation. The mesh screen 72 prevents any such material from contacting and covering the openings in the bottom of the retort, which covering, if permitted to occur, would obstruct in such region the upward flow of the fluidizing air, thereby producing an undesired channeling of the air and consequent uneven heating in the fluid bed.

The basket 70 further comprises an annular ring 74, a plurality of vertical connecting rods commonly designated at 76, the opposite ends of which are connected respectively to the ring 74 and the bottom screen 72, and a plurality of spaced hooks or rings commonly designated at 78 which facilitate handling of the basket to and from its FIG. 2 position. The top ends of the rods 76 extend laterally outwardly into contact with the skirt 54 of the retort 40, thereby to vertically space the basket from the retort. A plurality of angular supporting ledges commonly designated at 80 are mounted on the skirt 54 and serve as positive stops to predeterminedly vertically space the bottom of the basket 70 above the retort bottom.

The door 14 is provided with insulating material 84 and further includes a preferably annular sealing flange 86 which extends into a sand trough 88 when the door is closed for sealing the same. The furnace surrounding the top opening is insulated in the usual manner as indicated at 90.

The operation of the furnace should be apparent from the above description. The sand bed is fluidized by the admission of air from the fluidizer 36 upwardly through the openings in the retort bottom. With the furnace door 14 in an open position, the basket 70 is lowered into the fluidized sand bed 17 and the rotor R or like article to be treated is similarly lowered into the fluid bed. The burner assemblies 28 are fired thereby to heat the sand bed to the desired temperature. The furnace normally operates with a fluid bed temperature in the approximate range of 800°–1200° F., with the temperature in the combustion chamber 46 being approximately 400° F. higher. It will be understood that the indicated temperature range is merely illustrative for a particular operation, and that the temperature may vary depending upon the type of insulation to be stripped or other uses for which the furnace may be employed. By virtue of the elevated temperatures and intimate contact of the moving sand particles with the surface of the rotor R, the epoxy or like insulation is stripped from the rotor in a fraction of the time heretofore required by conventional methods.

The hot, stripped articles are normally transferred to a fluid bed cooler to expedite the cooling of the article, with such cooler being of similar construction to the furnace described but not requiring heating or insulating means. The stripped and cooled article normally requires no further treatment such as wire brushing, steam cleaning, etc., usually required in conventional hot air treating methods.

It will thus be seen that the fluid bed furnace of the present invention provides distinct advantages over previous furnaces of this general type. The fluid bed treatment greatly reduces the stripping time when compared with conventional hot air oven treatment. Further, the stripping is of such quality that no further treatment of the article is required, except, perhaps, a quick blow-off of any ash remaining on the article surface. The exhaust system is uniquely constructed to provide substantially complete incineration of the burn-off fumes and a return to the fluid bed of any sand particles carried upwardly by the fluidizing air.

Although the above description has been directed to a fluid bed furnace having particular use in the stripping of articles immersed therein, the use of a similar apparatus for article cooling purposes has been noted, and it will be apparent that the novel features and advantages of the present invention would pertain as well to such cooler apparatus.

Other modes of applying the principle of the invention may be employed, change being made as regards the details described, provided the features stated in any of the folowing claims or the equivalent of such be employed.

We therefore particularly point out and distinctly claim as our invention:

1. A fluid bed furnace for treating articles immersed in a fluid bed therein, comprising an outer casing, a vessel adapted to contain a bed of finely divided solid material mounted within and insulated from said casing and defining therebetween a combustion chamber, burner means communicating with said combustion chamber for heating said finely divided solid material in said vessel, first exhaust passage means communicating said combustion chamber with an exhaust stack exteriorly of said furnace for exhausting the products of combustion of said burner means, means for admitting a fluidizing medium to said vessel for fluidizing said bed of finely divided solid material thereby to effect intimate heat exchange between the fluidized material and the article immersed therein, second exhaust passage means separate and radially inwardly from said first exhaust passage means for exhausting from said vessel the fluidizing medium and the fumes resulting from the heating of said article, and upwardly extending partition means forming a common wall for said first and second exhaust passage means, said partition means being formed with openings providing controlled communication between said first and second exhaust passage means for commingling said products of combustion and said fumes prior to passage through said exhaust stack thereby to enhance incineration of such fumes, wherein said common wall comprises an upwardly and outwardly inclined skirt portion of said vessel.

2. A fluid bed furnace for treating articles immersed in a fluid bed therein, comprising an outer casing, a vessel adapted to contain a bed of finely divided solid material mounted within and insulated from said casing and defining therebetween a combustion chamber, burner means communicating with said combustion chamber for heating said finely divided solid material in said vessel, first exhaust pasage means communicating said combustion chamber with an exhaust stack exteriorly of said furnace for exhausting the products of combustion of said burner means, means for admitting a fluidizing medium to said vessel for fluidizing said bed of finely divided solid material thereby to effect intimate heat exchange between the fluidized material and the article immersed therein, second exhaust passage means separate and radially inwardly from said first exhaust passage means for exhausting from said vessel the fluidizing medium and the fumes resulting from the heating of said article, and upwardly extending partition means forming a common wall foi said first and second exhaust passage means, said partition means being formed with openings providing controlled communication between said first and second exhaust passage means for commingling said products of combustion and said fumes prior to passage through said exhaust stack thereby to enhance incineration of such fumes, wherein said openings formed in said common wall are generally opposite said exhaust stack thereby to provide commingling of said products of combustion and said fumes well before passage to said exhaust stack, and further including baffle means associated with each of said openings for preventing passage of entrained particles of said material to said first exhaust passage means.

3. A fluid bed furnace for treating articles immersed in a fluid bed therein, comprising an outer casing, a vessel adapted to contain a bed of finely divided solid material mounted within and insulated from said casing and defining therebetween a combustion chamber, burner means communicating with said combustion chamber for heating aid finely divided solid material in said vessel, first exhaust passage means communicating said combustion chamber with an exhaust stack exteriorly of said furnace for exhausting the products of combustion of said burner means, means for admitting fluidizing medium to said vessel for fluidizing said bed of finely divided solid material thereby to effect intimate heat exchange between the fluidized material and the article immersed therein, second exhaust passage means separate and radially inwardly from said first exhaust passage means for exhausting from said vessel the fluidizing medium and the fumes resulting from the heating of said article, and upwardly extending partition means forming a common wall for said first and second exhaust passage means, said partition means being formed with openings providing controlled communication between said first and second exhaust passage means for commingling said products of combustion and said fumes prior to passage through said exhaust stack thereby to enhance incineration of such fumes, further including basket means removably suspended in said vessel and spaced from the bottom thereof, said basket being provided with a mesh screen bottom portion to prevent material dropping from the article being treated from adversely affecting the fluid entering said vessel from said fluidizing means.

4. Fluid bed apparatus for treating articles immersed therein comprising a vessel containing a body of finely divided solid material, cover means for closing said vessel, gas-fired means for heating said vessel and thus said body of finely divided material, means for supplying fluidizing gas under pressure to said body of finely divided solid material for fluidizing the same, means defining an annular passageway within the upper region of said apparatus for receiving such fluidizing gas after it has passed upwardly through said body of finely divided solid material, said passageway communicating with an exhaust stack for exhausting from said apparatus said fluidizing gas and the gaseous products of combustion, and conduit means for conveying the products of combustion of said heating means directly to said passageway in the region thereof generally opposite to said exhaust stack thereby to provide intimate commingling of said fluidizing gas and organic fumes and said gaseous products of combustion thereby effecting substantially complete combustion of said fumes rior to reaching said exhaust stack.

5. Fluid bed apparatus for treating articles immersed therein comprising a vessel containing a bed of finely divided solid material, cover means adjacent the top of said vessel for closing the same, means for supplying fluidizing gas under pressure to said bed of finely divided solid material for fluidizing the same, exhaust outlet means for exhausting said fluidizing gas from said apparatus after it has passed upwardly through said finely divided solid material, and upwardly extending baffle means disposed intermediate said bed and said cover in the path of gas flow to said exhaust outlet means, said baffle means intercepting entrained sand carried by said fluidizing gas and returning the same by gravity to said bed, wherein said baffle means comprises an upwardly and outwardly inclined skirt portion formed at the top of said vessel, the upper end of said skirt having connected thereto a horizontal, inwardly directed annular top plate, and a cylindrical sleeve secured to said top plate and extending vertically downwardly and terminating adjacent said skirt, said skirt, top plate and sleeve forming an exhaust passage for fluid passing upwardly through said body, said sleeve being formed with a plurality of openings through which such fluid can pass for entry to said exhaust passage, any entrained sand passing through such openings contacting said skirt and gravitating downwardly through the space between the bottom of said sleeve and said skirt for return to said body.

6. Fluid bed apparatus for treating articles immersed therein comprising a vessel containing a bed of finely divided solid material, cover means adjacent the top of said vessel for closing the same, means for supplying fluidizing gas under pressure to said bed of finely divided solid material for fluidizing the same, exhaust outlet means for exhausting said fluidizing gas from said apparatus after it has passed upwardly through said finely divided solid material, and upwardly extending baffle means disposed intermediate said bed and said cover in the path of gas flow to said exhaust outlet means, said baffle means intercepting entrained sand carried by said fluidizing gas and returning the same by gravity to said bed, wherein said baffle means comprises an upwardly and outwardly inclined skirt portion formed at the top of said vessel, the upper end of said skirt having connected thereto a horizontal, inwardly directed annular top plate, and a cylindrical sleeve secured to said top plate and extending vertically downwardly and terminating adjacent said skirt, said skirt, top plate and sleeve forming an exhaust passage for fluid passing upwardly through said body, said sleeve being formed with a plurality of openings through which such fluid can pass for entry to said exhaust passage, any entrained sand passing through such openings contacting said skirt and gravitating downwardly through the space between the bottom of said sleeve and said skirt for return to said body, and further including gas burner means disposed exteriorly of said vessel for heating the same, said skirt partially defining a second exhaust passage radially outward of said first recited exhaust passage, said second exhaust passage communicating with said outlet means, said skirt being formed with openings in the region thereof generally opposite said exhaust outlet means for passage of said gas and organic fumes entrained thereby from said first recited exhaust passage to said second exhaust passage, and means for directing the gaseous products of combustion from said gas burner means directly to said second exhaust passage for commingling with said fluidizing gas and organic fumes thereby to substantially completely incinerate the latter prior to reaching said exhaust outlet means.

References Cited

UNITED STATES PATENTS

| | | |
|---|---|---|
| 2,212,120 | 8/1940 | Kneale et al. |
| 2,554,701 | 5/1951 | Hackett et al. |
| 3,012,331 | 12/1961 | Oholm et al. _____ 34—57 X |
| 3,053,704 | 9/1962 | Munday. |
| 3,216,125 | 11/1965 | Dennert _____ 263—21 X |
| 3,250,521 | 5/1966 | Sergent _____ 263—21 |

JOHN J. CAMBY, *Acting Primary Examiner.*